(12) United States Patent
Davis et al.

(10) Patent No.: US 8,545,797 B2
(45) Date of Patent: Oct. 1, 2013

(54) GERMANOSILICATE SSZ-75

(75) Inventors: Tracy M. Davis, Pinole, CA (US); Anton Petushkov, Iowa City, IA (US)

(73) Assignee: Chevron U.S.A. Inc., San Ramon, CA (US)

( * ) Notice: Subject to any disclaimer, the term of this patent is extended or adjusted under 35 U.S.C. 154(b) by 156 days.

(21) Appl. No.: 13/096,558

(22) Filed: Apr. 28, 2011

(65) Prior Publication Data

US 2012/0275995 A1 Nov. 1, 2012

(51) Int. Cl.
*C01B 33/36* (2006.01)

(52) U.S. Cl.
USPC ........................................................ 423/700

(58) Field of Classification Search
None
See application file for complete search history.

(56) References Cited

U.S. PATENT DOCUMENTS

| | | | |
|---|---|---|---|
| 4,910,006 A | 3/1990 | Zones et al. | |
| 5,166,111 A | 11/1992 | Zones et al. | |
| 5,268,161 A | 12/1993 | Nakagawa | |
| 5,316,753 A | 5/1994 | Nakagawa | |
| 5,371,307 A | 12/1994 | Guth et al. | |
| 6,733,742 B1 * | 5/2004 | Elomari | 423/706 |
| 7,465,835 B2 | 12/2008 | Zones et al. | |
| 7,651,603 B2 | 1/2010 | Zones et al. | |
| 7,713,512 B2 | 5/2010 | Zones et al. | |
| 7,749,473 B2 | 7/2010 | Zones et al. | |
| 7,750,196 B2 | 7/2010 | Zones et al. | |
| 7,906,698 B2 | 3/2011 | Zones et al. | |
| 2006/0140854 A1 | 6/2006 | Juttu et al. | |
| 2007/0284284 A1 * | 12/2007 | Zones et al. | 208/26 |
| 2007/0286782 A1 | 12/2007 | Zones et al. | |
| 2007/0286800 A1 | 12/2007 | Zones et al. | |
| 2008/0058196 A1 | 3/2008 | Zones et al. | |
| 2008/0293990 A1 | 11/2008 | Stevenson et al. | |
| 2010/0121122 A1 | 5/2010 | Zones et al. | |

OTHER PUBLICATIONS

S.B. Hong, E.G. Lear, P.A.Wright, W. Zhou, P.A. Cox, C.-H. Shin,J.-H. Park, L-S. Nam "Synthesis, Structure Solution, Characterization, and Catalytic Properties of TNU-10: A High-Silica Zeolite with the STI Topology" J. Am. Chem. Soc., 2004, 126, 5817-5826.
PCT International Search Report, PCT/US2012/030082, mailed Sep. 24, 2012.

* cited by examiner

*Primary Examiner* — Curtis Mayes
*Assistant Examiner* — Bijay Saha
(74) *Attorney, Agent, or Firm* — Terrence Flaherty

(57) ABSTRACT

The present invention relates to new germanosilicate SSZ-75 molecular sieve, and methods for synthesizing germanosilicate SSZ-75.

4 Claims, 4 Drawing Sheets

GERMANOSILICATE SSZ-75

TECHNICAL FIELD

The present invention relates to new germanosilicate molecular sieve SSZ-75 and methods for synthesizing the same.

BACKGROUND

Molecular sieves having the STI framework topology defined by the connectivity of the tetrahedral atoms (referred to herein simply as "STI") are known. See, for example, Ch. Baerlocher et al., *Atlas of Zeolite Framework Types*, 6th Revised Edition, 2007 of the International Zeolite Association. Examples of STI molecular sieves include naturally occurring stilbite, the zeolite designated TNU-10, and the molecular sieve designated SSZ-75. Stilbite is disclosed by D. W. Breck, *Zeolite Molecular Sieves: Structure Chemistry and Use* 1984, Robert E. Krieger Publishing Company. TNU-10 is reported by S. B. Hong et al., *J. Am. Chem. Soc.* 2004, 126, 5817-5826. SSZ-75 is disclosed in U.S. Pat. No. 7,713,512.

Because of their unique sieving characteristics, as well as their catalytic properties, crystalline molecular sieves and zeolites are especially useful in applications such as hydrocarbon conversion, gas drying and separation. Although many different crystalline molecular sieves have been disclosed, there is a continuing need for new molecular sieves with desirable properties for gas separation and drying, hydrocarbon and chemical conversions, and other applications. New molecular sieves may contain novel internal pore architectures, providing enhanced selectivity in these processes.

SUMMARY OF THE INVENTION

In accordance with the present invention, there is provided a crystalline molecular sieve having STI topology and having silicon to germanium mole ratio of less than 15.

The present invention further provides such a crystalline molecular sieve having a composition comprising, as-synthesized and in its anhydrous state, in terms of mole ratios, the following:

| | |
|---|---|
| Si/Ge | <15 |
| $M_{2/n}$/Si | 0 to 0.03 |
| Q/Si | 0.02 to 0.08 |
| F/Si | 0.01 to 0.04 | wherein M is an alkali metal cation, an alkaline earth metal cation or a mixture thereof; n is the valence of M; Q is a tetramethylene-1,4-bis-(N-methylpyrrolidinium) dication; and F is fluoride.

The present invention also includes a method of preparing a molecular sieve, the method comprising contacting under crystallization conditions a source of silicon; a source of germanium; a source of fluoride ions; and a structure directing agent comprising a tetramethylene-1,4-bis-(N-methylpyrrolidinium) dication.

DETAILED DESCRIPTION

Figure 1:
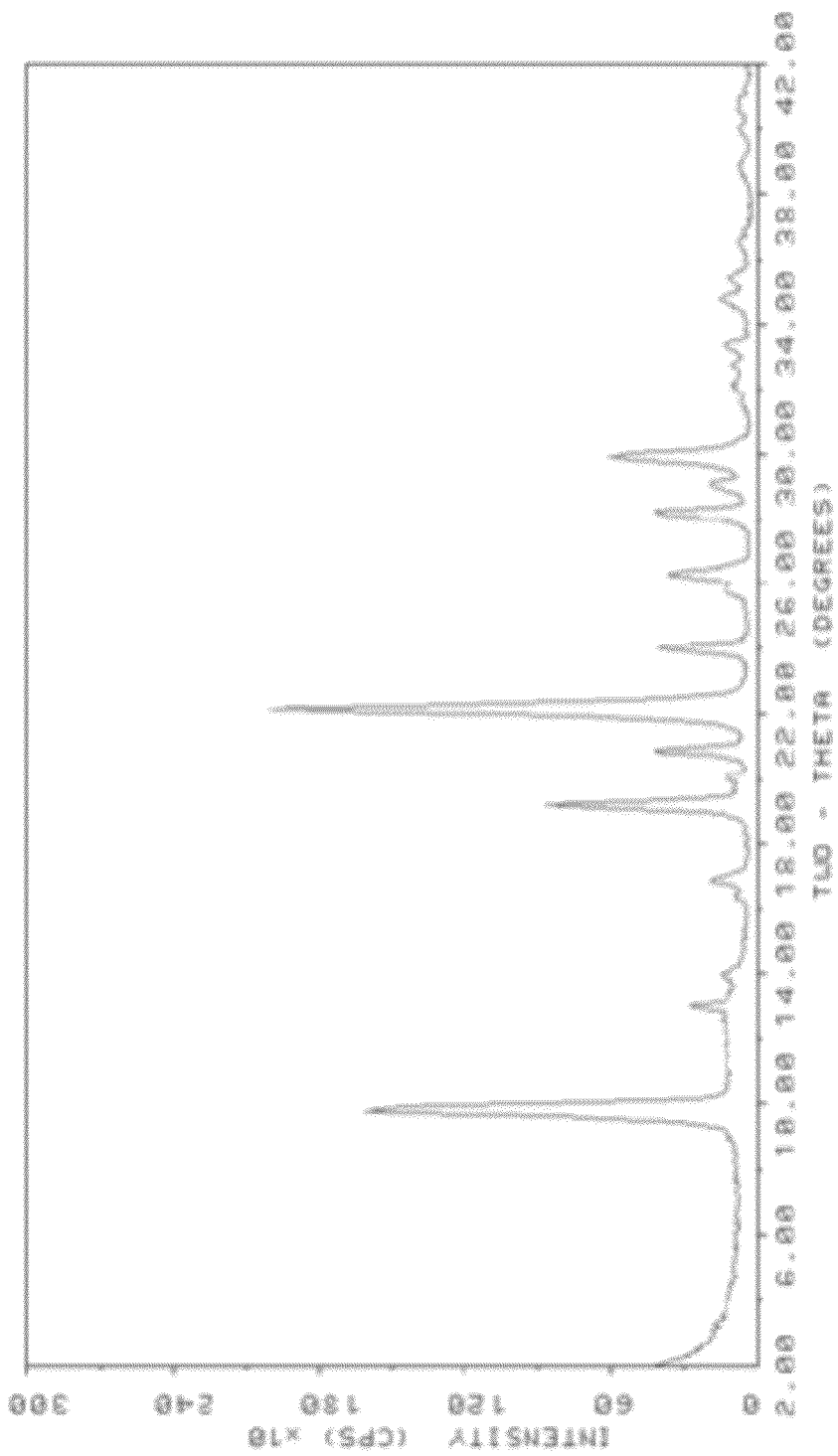
FIG. 1 shows the powder X-ray diffraction (XRD) pattern of the as-synthesized germanosilicate SSZ-75 product of Example 1.

The present invention comprises a molecular sieve designated herein "molecular sieve SSZ-75" or simply "SSZ-75."

In preparing the germanosilicate SSZ-75 of the invention, a tetramethylene-1,4-bis-(N-methylpyrrolidinium) dication is used as a structure directing agent ("SDA"), also known as a crystallization template. The SDA useful for making germanosilicate SSZ-75 has the following structure:

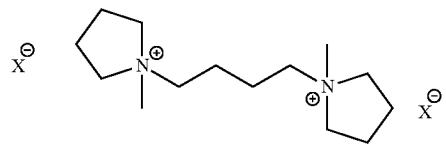

The SDA dication is associated with anions (X) which may be any anion that is not detrimental to the formation of the molecular sieve. Representative anions include halogen (e.g., fluoride, chloride, bromide and iodide), hydroxide, acetate, sulfate, tetrafluoroborate, carboxylate, and the like. Typically, the anion is hydroxide. The SDA may be used to provide hydroxide ion. Thus, it is beneficial to ion exchange, for example, a halide to hydroxide ion.

The tetramethylene-1,4-bis-(N-methylpyrrolidinium) dication SDA can be prepared by a method similar to that described in U.S. Pat. No. 5,166,111, which discloses a method for preparing a bis(1,4-diazoniabicyclo[2.2.2]octane) alpha omega alkane di-quaternary ammonium ion component, or U.S. Pat. No. 5,268,161, which discloses a method for preparing 1,3,3,8,8-pentamethyl-3-azoniabicyclo[3.2.1] octane cation.

In general, germanosilicate SSZ-75 is prepared by contacting a source of silicon, and a source of germanium with the tetramethylene-1,4-bis-(N-methylpyrrolidinium) dication SDA in the presence of fluoride ion.

Typical sources of silicon (Si) include silica hydrogel, silicic acid, colloidal silica, tetraalkyl orthosilicates (e.g., tetraethyl orthosilicate), silica hydroxides, and fumed silicas.

Typical sources of germanium (Ge) include germanium oxide, germanium alkoxides (e.g., germanium ethoxide, germanium isopropoxide), germanium chloride and sodium germanate.

Typical sources of fluoride (F) include ammonium fluoride, hydrofluoric acid, and other suitable fluoride-containing compounds.

Germanosilicate SSZ-75 is prepared from a reaction mixture comprising, in terms of mole ratios, the following:

| | |
|---|---|
| Si/Ge | 5 to 50 |
| OH/Si | 0.20 to 0.80 |
| Q/Si | 0.10 to 0.40 |
| $M_{2/n}$/Si | 0 to 0.04 |
| $H_2O$/Si | 2 to 10 |
| F/Si | 0.20 to 0.80 | wherein M is an alkali metal cation, an alkaline earth metal cation or a mixture thereof; n is the valence of M (i.e., 1 or 2);

Q is a tetramethylene-1,4-bis-(N-methylpyrrolidinium) dication; and F is fluoride. In one embodiment, the reaction mixture has a Si to Ge mole ratio of from 5 to 30. Optionally, the reaction mixture may further comprise a source of aluminum.

In practice, germanosilicate SSZ-75 is prepared by a process comprising: preparing an aqueous solution containing a source of silicon, a source of germanium, a source of fluoride ions, and a tetramethylene-1,4-bis-(N-methylpyrrolidinium) dication having an anionic counter-ion which is not detrimental to the formation of the molecular sieve; maintaining the aqueous solution under conditions sufficient to form crystals of the molecular sieve; and recovering the crystals of the molecular sieve.

The reaction mixture is maintained at an elevated temperature until the crystals of the germanosilicate SSZ-75 are formed. The hydrothermal crystallization is usually conducted under autogenous pressure, at a temperature between 100° C. and 200° C., typically between 150° C. and 180° C. The crystallization period is typically greater than 1 day and often from 3 days to 20 days. The molecular sieve may be prepared using mild stirring or agitation.

During the hydrothermal crystallization step, the germanosilicate SSZ-75 crystals can be allowed to nucleate spontaneously from the reaction mixture. The use of SSZ-75 crystals as seed material can be advantageous in decreasing the time necessary for complete crystallization to occur. In addition, seeding can lead to an increased purity of the product obtained by promoting the nucleation and/or formation of germanosilicate SSZ-75 over any undesired phases. When used as seeds, SSZ-75 crystals are added in an amount between 0.1 and 5% of the weight of the source of silicon used in the reaction mixture.

Once the molecular sieve crystals have formed, the solid product is separated from the reaction mixture by standard mechanical separation techniques such as filtration. The crystals are water-washed and then dried, e.g., at 90° C. to 150° C. for from 8 to 24 hours, to obtain the as-synthesized germanosilicate SSZ-75 crystals. The drying step can be performed at atmospheric pressure or under vacuum.

Germanosilicate SSZ-75 has a composition, as-synthesized (i.e., prior to removal of the SDA from the molecular sieve) and in its anhydrous state, comprising the following (in terms of mole ratios):

| | |
|---|---|
| Si/Ge | <15 |
| $M_{2/n}$/Si | 0 to 0.03 |
| Q/Si | 0.02 to 0.08 |
| F/Si | 0.01 to 0.04 | wherein M is an alkali metal cation, alkaline earth metal cation or mixture thereof; n is the valence of M (i.e., 1 or 2); Q is a tetramethylene-1,4-bis-(N-methylpyrrolidinium) dication; and F is fluoride.

Germanosilicate SSZ-75 (whether in the as-synthesized or calcined version) has a Si to Ge mole ratio of less than 15, for example, from 2 to 13 or from 3 to 12.

Germanosilicate SSZ-75 has the STI framework topology. It is characterized by its XRD pattern. Germanosilicate SSZ-75, as-synthesized, has a crystalline structure whose powder XRD pattern exhibits the characteristic lines shown in Table 1.

TABLE 1

| 2-Theta (degrees)[a] | d-Spacing (Angstroms) | Relative Integrated Intensity (%)[b] |
|---|---|---|
| 9.92 | 8.91 | VS |
| 19.31 | 4.59 | M |
| 20.95 | 4.24 | M |
| 22.22 | 3.99 | VS |
| 24.09 | 3.69 | W |
| 26.37 | 3.38 | M |
| 28.24 | 3.16 | M |
| 29.09 | 3.07 | W |
| 29.99 | 2.98 | M |

[a] ±0.20
[b] The X-ray patterns provided are based on a relative intensity scale in which the strongest line in the X-ray pattern is assigned a value of 100: W (weak) is less than 20; M (medium) is between 20 and 40; S (strong) is between 40 and 60; VS (very strong) is greater than 60.

Table 1A below shows the powder XRD lines for as-synthesized germanosilicate SSZ-75 including actual relative intensities.

TABLE 1A

| 2-Theta (degrees)[a] | d-Spacing (Angstroms) | Relative Integrated Intensity (%) |
|---|---|---|
| 7.03 | 12.57 | 4.1 |
| 8.09 | 10.91 | 2.3 |
| 8.96 | 9.86 | 2.6 |
| 9.92 | 8.91 | 62.4 |
| 13.07 | 6.77 | 2.9 |
| 14.67 | 6.03 | 2.7 |
| 17.02 | 5.20 | 8.9 |
| 19.31 | 4.59 | 38.0 |
| 20.18 | 4.40 | 3.4 |
| 20.95 | 4.24 | 20.1 |
| 22.22 | 4.00 | 100.0 |
| 24.10 | 3.69 | 14.1 |
| 25.90 | 3.44 | 3.0 |
| 26.37 | 3.38 | 21.6 |
| 28.24 | 3.16 | 25.5 |
| 29.09 | 3.07 | 9.9 |
| 29.99 | 2.98 | 28.7 |
| 32.24 | 2.77 | 2.2 |
| 33.38 | 2.68 | 7.3 |
| 34.87 | 2.57 | 8.4 |
| 35.46 | 2.53 | 5.3 |
| 36.31 | 2.47 | 1.3 |
| 38.75 | 2.32 | 1.9 |
| 40.89 | 2.21 | 5.3 |

[a] ±0.20

After calcination, the powder XRD pattern for germanosilicate SSZ-75 exhibits the characteristic lines shown in Table 2 below.

TABLE 2

| 2-Theta (degrees)[a] | d-Spacing (Angstroms) | Relative Integrated Intensity (%)[b] |
|---|---|---|
| 10.00 | 8.83 | VS |
| 13.14 | 6.73 | W |
| 19.38 | 4.58 | M |
| 21.03 | 4.22 | M |
| 22.35 | 3.97 | VS |
| 24.19 | 3.68 | W |
| 26.43 | 3.36 | M |
| 28.37 | 3.14 | W |
| 30.16 | 2.96 | M |

[a] ±0.20
[b] The X-ray patterns provided are based on a relative intensity scale in which the strongest line in the X-ray pattern is assigned a value of 100: W (weak) is less than 20; M (medium) is between 20 and 40; S (strong) is between 40 and 60; VS (very strong) is greater than 60.

The powder XRD patterns were determined by standard techniques. The radiation was CuKα radiation. The peak heights and the positions, as a function of 2θ where θ is the Bragg angle, were read from the relative intensities of the peaks, and d, the interplanar spacing in Angstroms corresponding to the recorded lines, can be calculated.

The variation in the scattering angle (2-theta) measurements, due to instrument error and to differences between individual samples, is estimated at ±0.20 degrees.

Representative peaks from the XRD pattern of as-synthesized germanosilicate SSZ-75 are shown in Table 1. Calcination can result in changes in the intensities of the peaks as compared to patterns of the "as-synthesized" material, as well as minor shifts in the diffraction pattern.

The crystalline germanosilicate SSZ-75 can be used as-synthesized, but preferably will be thermally treated (calcined). Usually, it is desirable to remove the alkali metal cation (if any) by ion exchange and replace it with hydrogen, ammonium, or any desired metal ion. Calcined germanosilicate SSZ-75 has an n-hexane adsorption of about 0.16 cc/g.

Germanosilicate SSZ-75 can be formed into a wide variety of physical shapes. Generally speaking, the molecular sieve can be in the form of a powder, a granule, or a molded product, such as extrudate having a particle size sufficient to pass through a 2-mesh (Tyler) screen and be retained on a 400-mesh (Tyler) screen. In cases where the catalyst is molded, such as by extrusion with an organic binder, the germanosilicate SSZ-75 can be extruded before drying, or, dried or partially dried and then extruded.

Germanosilicate SSZ-75 can be composited with other materials resistant to the temperatures and other conditions employed in organic conversion processes. Such matrix materials include active and inactive materials and synthetic or naturally occurring zeolites as well as inorganic materials such as clays, silica and metal oxides. Examples of such materials and the manner in which they can be used are disclosed in U.S. Pat. Nos. 4,910,006 and 5,316,753.

Germanosilicate SSZ-75 may be useful as an adsorbent for gas separations (owing to its high pore volume while maintaining diffusion control and hydrophobicity). Germanosilicate SSZ-75 can also be used as a catalyst for converting oxygenates (such as methanol) to olefins, in the alkylation of aromatics, in reforming reactions, or for making small amines. Germanosilicate SSZ-75 can be used to reduce oxides of nitrogen in gas streams (such as automotive exhaust). Germanosilicate SSZ-75 can also be used as a cold start hydrocarbon trap in combustion engine pollution control systems. Germanosilicate SSZ-75 is particularly useful for trapping $C_3$ fragments.

EXAMPLES

The following examples are given to illustrate the present invention. It should be understood, however, that the invention is not to be limited to the specific conditions or details described in these examples.

Example 1

4.6 g of a hydroxide solution of tetramethylene-1,4-bis-(N-methylpyrrolidinium) dication SDA ([OH—]=0.69 mmol/g) was added to a Teflon cup (for a Parr 23 mL autoclave). Next, 0.015 g of SSZ-75 seed crystals, 0.110 g of ammonium fluoride, 1.5 g of tetraethylorthosilicate (TEOS) and 0.18 g of germanium ethoxide were added. The Teflon cup was covered with PARAFILM® and stirred overnight at room temperature to allow for hydrolysis of the TEOS. Then the PARAFILM® was removed to permit evaporation of ethanol and excess water. Following evaporation, an appropriate amount of water was added to the Teflon cup giving a final gel molar composition of 10 Si:Ge:4.4 OH:4.4 $NH_4F$:77 $H_2O$. The mixture was stirred until homogeneous. At this point, the Teflon cup was closed and sealed in a stainless steel autoclave. The reaction was heated at 170° C. while rotating at 43 rpm for 7 days. Upon crystallization, the gel was recovered from the autoclave, filtered and rinsed with deionized water.

Powder XRD of the dried product crystals confirmed the sample to have the stilbite structure (see FIG. 1).

Figure 2:
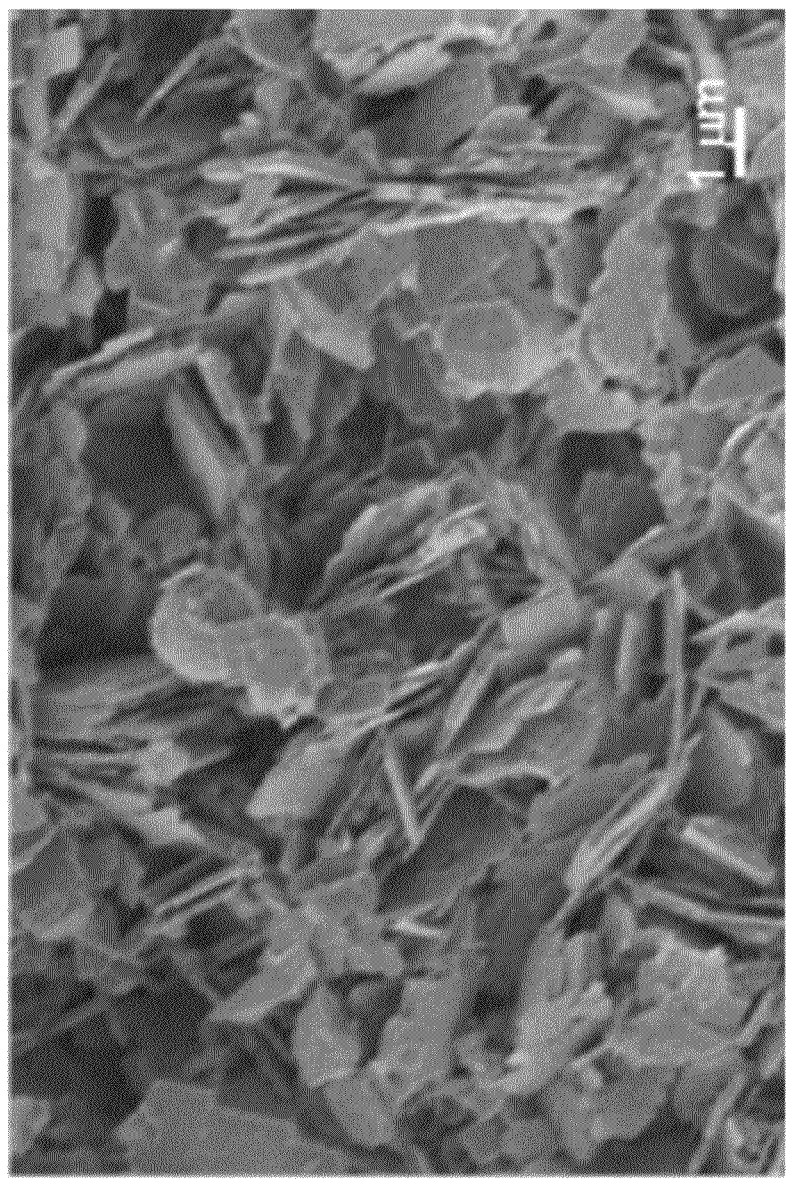
FIG. 2 shows the scanning electron microscopy (SEM) image of the as-synthesized germanosilicate SSZ-75 product of Example 1.

SEM of the as-made material shows plate-like crystals (see FIG. 2).

Example 2

3.32 g of a hydroxide solution of tetramethylene-1,4-bis-(N-methylpyrrolidinium) dication SDA ([OH—]=1.04 mmol/g) was added to a Teflon cup (for a Parr 23 mL autoclave). Next, 0.015 g of SSZ-75 seed crystals, 0.110 g of ammonium fluoride, 1.5 g of TEOS and 0.364 g of germanium ethoxide were added. The Teflon cup was covered with PARAFILM® and stirred overnight at room temperature to allow for hydrolysis of the TEOS. Then the PARAFILM® was removed to permit evaporation of ethanol and excess water. Following evaporation, an appropriate amount of water was added to the Teflon cup giving a final gel molar composition of 5 Si:Ge:2.4 OH:2.4 $NH_4F$:35 $H_2O$. The mixture was stirred until homogeneous. At this point, the Teflon cup was closed and sealed in a stainless steel autoclave. The reaction was heated at 170° C. while rotating at 43 rpm for 7 days. Upon crystallization, the gel was recovered from the autoclave, filtered and rinsed with deionized water.

The Si to Ge mole ratio of the product was determined to be 6.7 by ICP analysis.

Figure 3:
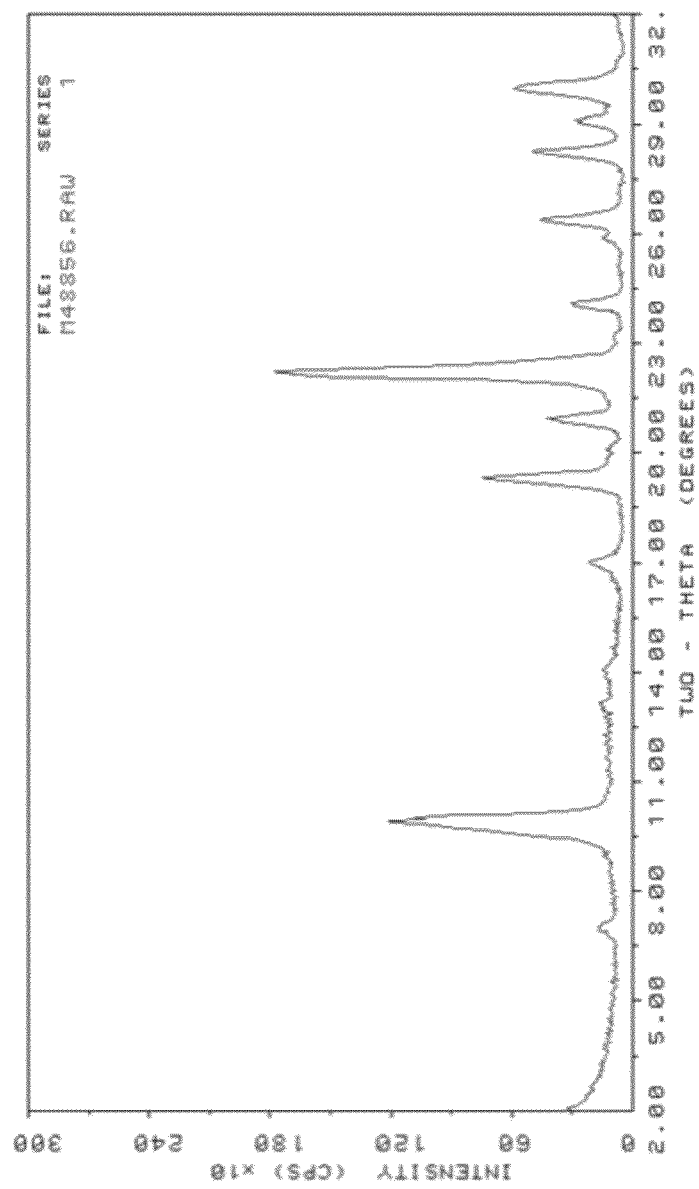
FIG. 3 shows the powder XRD pattern of the as-synthesized germanosilicate SSZ-75 product of Example 2.

Powder XRD of the dried product crystals confirmed the sample to have the stilbite structure (see FIG. 3).

Figure 4:
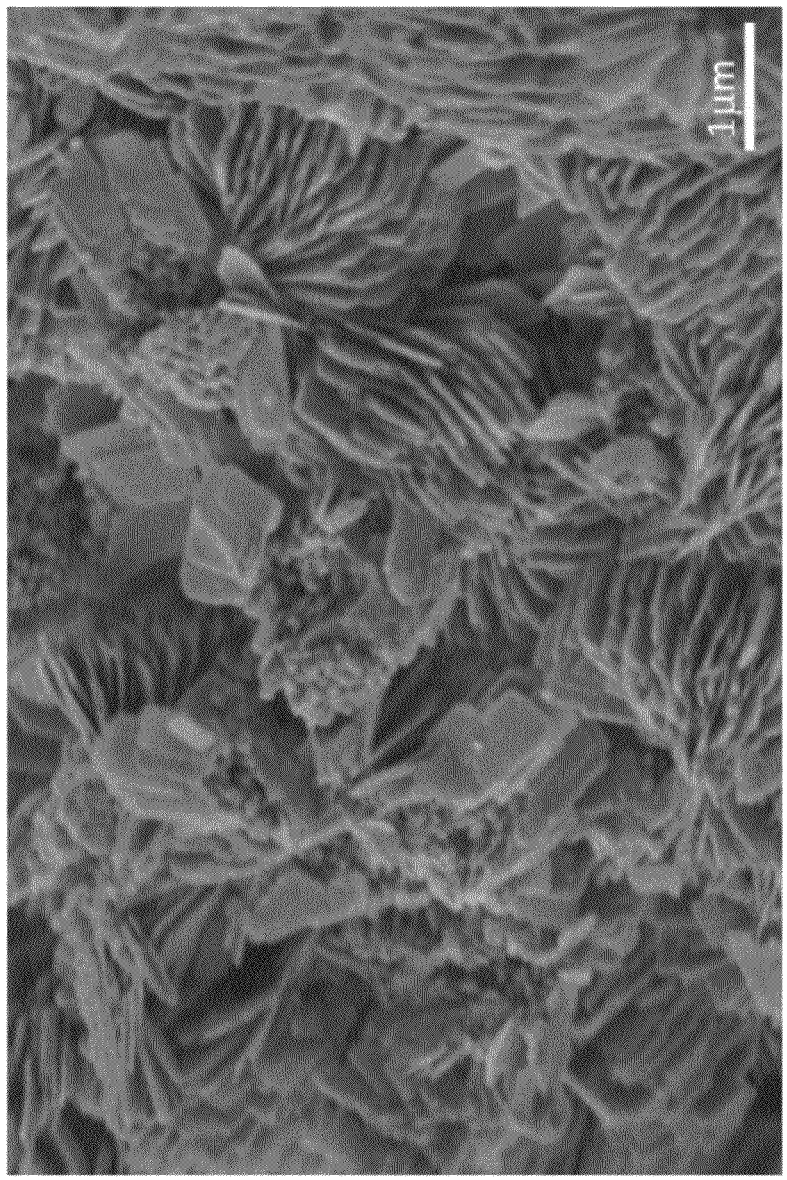
FIG. 4 shows the SEM image of the as-synthesized germanosilicate SSZ-75 product of Example 2.

SEM of the as-made material shows plate-like crystals (see FIG. 4).

For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the following specification and attached claims are approximations that can vary depending upon the desired properties sought to be obtained by the present invention. It is noted that, as used in this specification and the appended claims, the singular forms "a," "an," and "the," include plural references unless expressly and unequivocally limited to one referent. As used herein, the term "include" and its grammatical variants are intended to be non-limiting, such that recitation of items in a list is not to the exclusion of other like items that can be substituted or added to the listed items.

This written description uses examples to disclose the invention, including the best mode, and also to enable any person skilled in the art to make and use the invention. The patentable scope is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims. To an extent not inconsistent herewith, all citations referred to herein are hereby incorporated by reference.

The invention claimed is:

1. A crystalline molecular sieve having STI topology and having a silicon to germanium mole ratio of less than 15.

2. The molecular sieve of claim 1 having, after calcination, an X-ray diffraction pattern substantially as follows:

| 2-Theta (degrees) | d-Spacing (Angstroms) | Relative Integrated Intensity (%) |
|---|---|---|
| 10.00 ± 0.20 | 8.83 | VS |
| 13.14 ± 0.20 | 6.73 | W |
| 19.38 ± 0.20 | 4.58 | M |
| 21.03 ± 0.20 | 4.22 | M |
| 22.35 ± 0.20 | 3.97 | VS |
| 24.19 ± 0.20 | 3.68 | W |
| 26.43 ± 0.20 | 3.36 | M |
| 28.37 ± 0.20 | 3.14 | W |
| 30.16 ± 0.20 | 2.96 | M. |

3. A crystalline molecular sieve having a composition comprising, as-synthesized and in its anhydrous state, in terms of mole ratios, the following:

| | |
|---|---|
| Si/Ge | <15 |
| $M_{2/n}$/Si | 0 to 0.03 |
| Q/Si | 0.02 to 0.08 |
| F/Si | 0.01 to 0.04 | wherein M is an alkali metal cation, an alkaline earth metal cation or a mixture thereof; n is the valence of M; Q is a tetramethylene-1,4-bis-(N-methylpyrrolidinium) dication; and F is fluoride.

4. The molecular sieve of claim 3, wherein the Si to Ge mole ratio is from 3 to 12.

* * * * *